(12) United States Patent
Saib et al.

(10) Patent No.: US 6,429,885 B1
(45) Date of Patent: *Aug. 6, 2002

(54) GUI RESOURCE EDITOR FOR AN EMBEDDED SYSTEM

(75) Inventors: Joseph Saib, Englewood, CO (US); Atsushi Suzuki, San Diego, CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,153

(22) Filed: Oct. 30, 1998

(51) Int. Cl.[7] .................................. G09G 5/00
(52) U.S. Cl. ................ 345/854; 345/419; 345/851; 345/835; 345/765; 345/840; 345/762; 345/780
(58) Field of Search ................ 345/3, 334, 418, 345/419, 854, 851, 840, 835, 780, 765, 762, 352, 810; 717/4

(56) References Cited

U.S. PATENT DOCUMENTS

| | | | | |
|---|---|---|---|---|
| 5,204,947 A | * | 4/1993 | Bernstein et al. | 345/457 |
| 5,495,567 A | * | 2/1996 | Iizawa et al. | 345/334 |
| 5,687,376 A | * | 11/1997 | Celi, Jr. et al. | 717/4 |
| 5,870,559 A | * | 2/1999 | Leshem et al. | 345/854 |
| 5,907,658 A | * | 5/1999 | Murase et al. | 386/95 |
| 6,104,359 A | * | 8/2000 | Endres et al. | 345/3 |

\* cited by examiner

Primary Examiner—Mark Zimmerman
Assistant Examiner—Kimbinh T. Nguyen
(74) Attorney, Agent, or Firm—Blakely, Sokoloff, Taylor & Zafman LLP

(57) ABSTRACT

A technique for converting displayable objects of a graphics user interface (GUI) display into a code representation with minimal user intervention. The technique includes creation of the GUI display and analysis of each displayable object when prompted by the user to convert to a code representation. The analysis features accessing parameters of each displayable object to produce an object data file, a color data file storing colors used by the displayable objects of the GUI display and a bitmap data file to contain bitmaps of logos or images featured in the GUI display. These data files are complied with an implementation file featuring a software library to generate an executable program having the code representation of the GUI display.

20 Claims, 11 Drawing Sheets

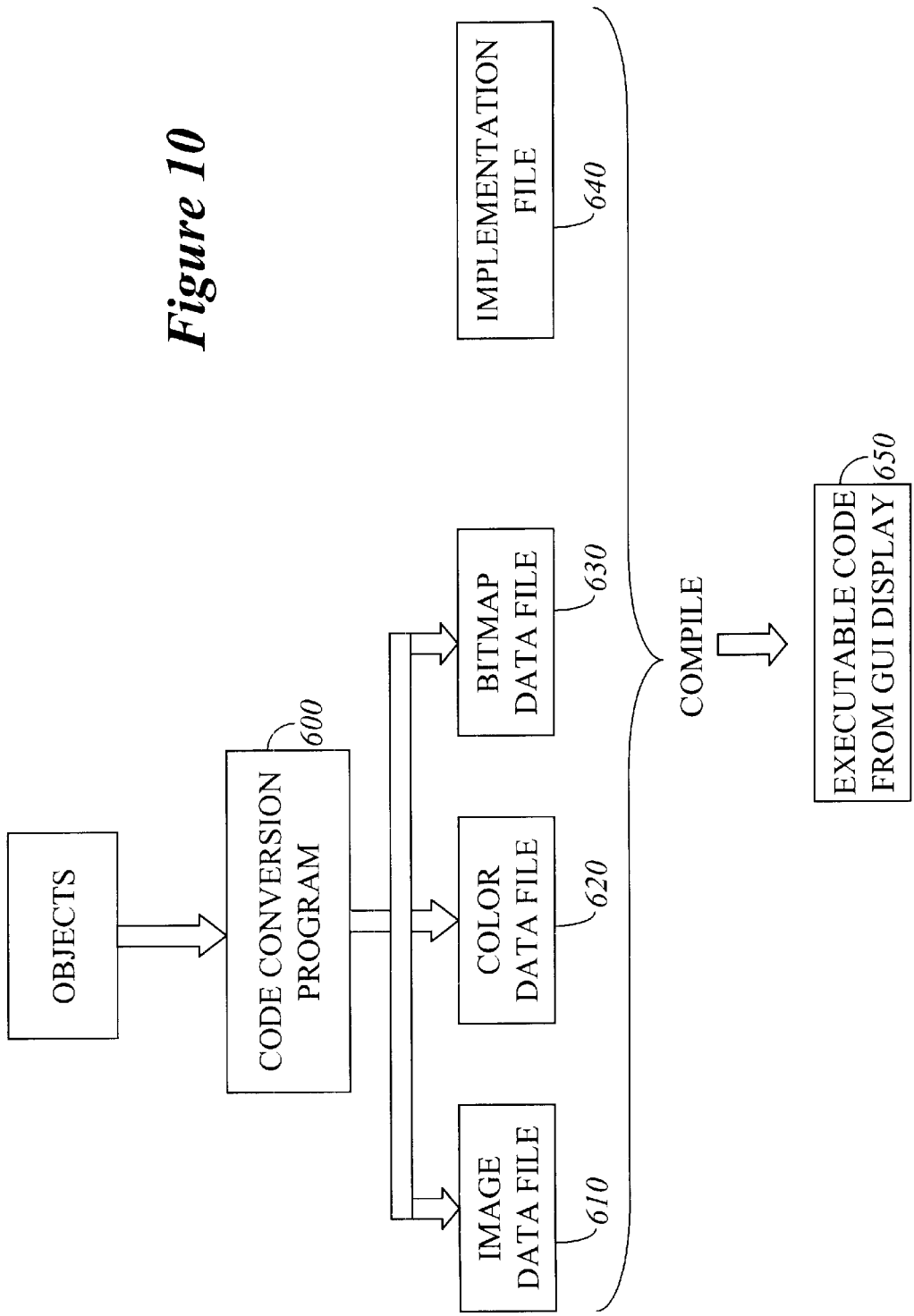

STRAIGHT = DIRECT PROPAGATION
OPPOSITE = CIRCULAR LOOPING
STOP = NOT AVAILABLE

NAVIGATION PARAMETERS ☐

UP:      STRAIGHT
DOWN:    OPPOSITE
LEFT:    STOP
RIGHT:   HELP CALLBACK()

*Figure 12*

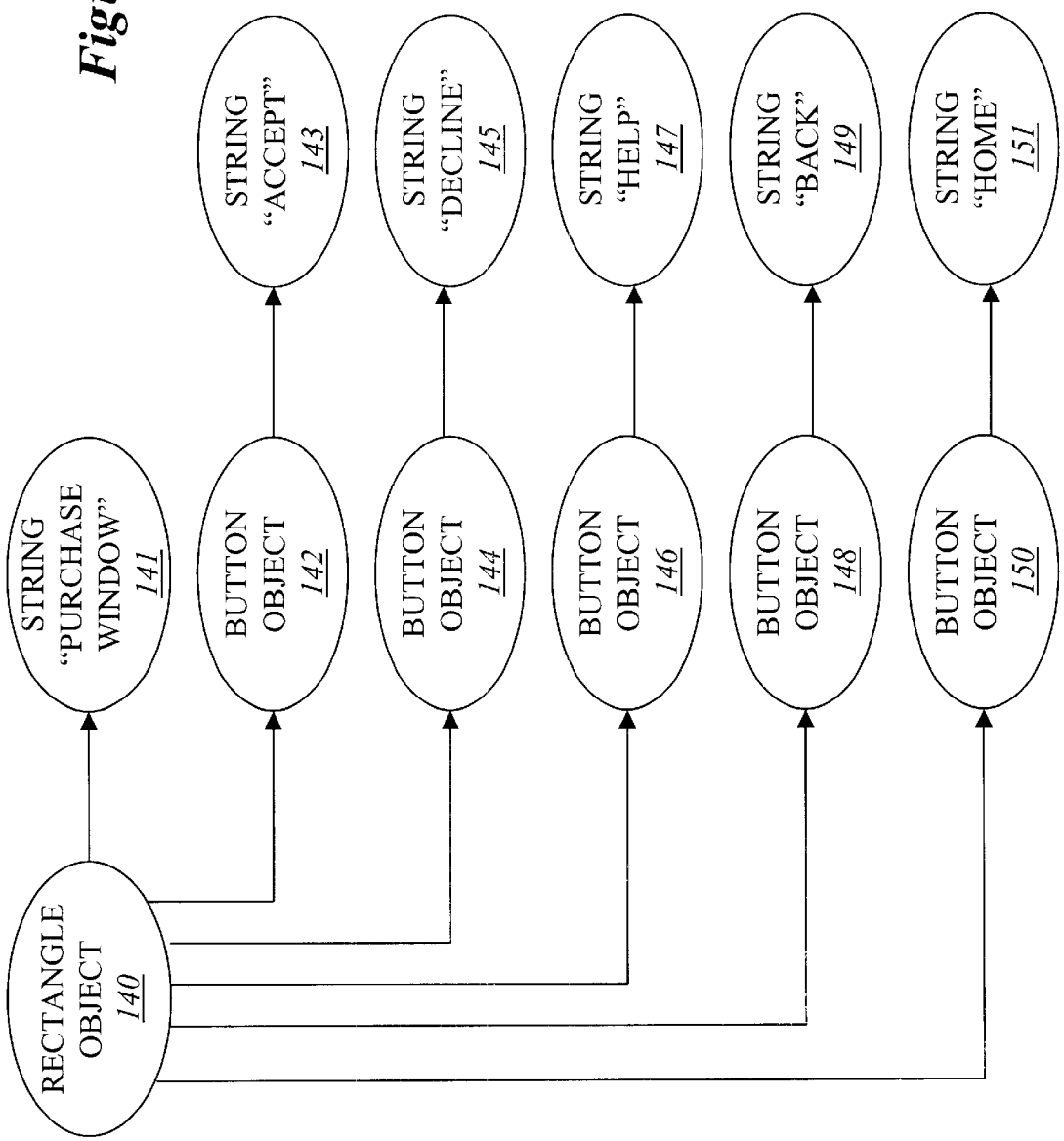

GUI RESOURCE EDITOR FOR AN EMBEDDED SYSTEM

BACKGROUND OF THE INVENTION

1. Field of the Invention

The present invention relates to the field of software. More particularly, the present invention relates to a software development tool producing code representative of a graphics user interface (GUI) display selected by a user.

2. Background Art

Over the last few years, there has been an increased demand for entertainment systems working in conjunction with various types of content providers such as broadcasters and cable companies. One type of entertainment system is a digital satellite system (DSS) featuring an antenna and an integrated receiver decoder (IRD) to receive a digital bit stream. IRD is responsible for decoding the bit stream and processing the decoded bit stream to produce an output signal of an appropriate format. The output signal is sent to one or more peripherals such as a television for displaying an image. The IRD includes hardware and software responsive to signals produced by depressing buttons on its front panel or on its remote control. These signals are interpreted by the RD as operational commands such as display a selected screen, tune to a selected channel and the like.

Typically, executable code for entertainment systems and other embedded systems is developed having a main program making function calls to sub-programs (referred to as "modules") which perform specific operations. Different software developers may be assigned the responsibility of programming different modules to interface with the main program. For example, a graphics user interface (GUI) of the entertainment system may include a first module featuring code that, when executed, causes an image of a button to be produced on a screen display. The GUT may further include a second module featuring code to illuminate the button, when selected, with a different color or greater pixel illumination intensity than normal. After these modules are completed, the main program is executed and linked with the modules acting as a software library to produce the screen display of the GUI. Thereafter, the modules associated with the screen display can be modified to achieve their desired visual impression.

It has been realized that both of this conventional coding technique is time-intensive in writing and debugging the code as well as modifying the code to produce a desired screen display. It is contemplated that it would be advantageous to develop a software tool that performs object-based programming and converts the selected objects of the screen display into software code.

SUMMARY OF THE INVENTION

A technique for converting displayable objects of a graphics user interface (GUI) display into a code representation with minimal user intervention. The technique includes creation of the GUI display and analysis of each displayable object when prompted by the user to convert to a code representation. The analysis features accessing parameters of each displayable object to produce an object data file, a color data file storing colors used by the displayable objects of the GUI display and a bitmap data file to contain bitmaps of logos or images featured in the GUI display. These data files are compiled with an implementation file featuring a software library to generate an executable program having the code representation of the GUI display.

BRIEF DESCRIPTION OF THE DRAWINGS

The features and advantages of the present invention will become apparent from the following detailed description in combination with the figures listed below.

FIG. 10 is an illustrative block diagram of the conversion from one or more displayable objects to a code representation.

FIGS. 11–12 are illustrative block diagrams of the navigation information associated with a Help button of the embodiment of the GUI display of FIG. 1.

FIG. 13 is an illustrative block diagram of information loaded into the object data file of FIG. 10 to provide information about the relationship between objects of the GUI display of FIG. 1.

DETAILED DESCRIPTION OF AN EMBODIMENT OF THE INVENTION

An embodiment of the present invention relates a software development tool that produces code for a graphics user interface (GUI) display after selection and adjustment of displayable objects of the GUI display. Herein, various terms are used to describe certain elements or characteristics of the present invention. For example, an "embedded system" is broadly defined as hardware having information processing capabilities. Embodiments of an embedded system include an integrated receiver decoder (IRD), a cable box, an Internet terminal (e.g., WEB TV™) and the like. A "communication line" is generally defined as any medium providing a communication path for signals such as, for example, one or more electrical wire(s), fiber optics, cable(s) or even wireless communications. A "signal" is defined as information such as data, address, control or any combination thereof. Examples of these signals include a sequence of digital waveforms or light pulses, analog waveforms, or any other modulated or non-modulated waveform.

Figure 1:
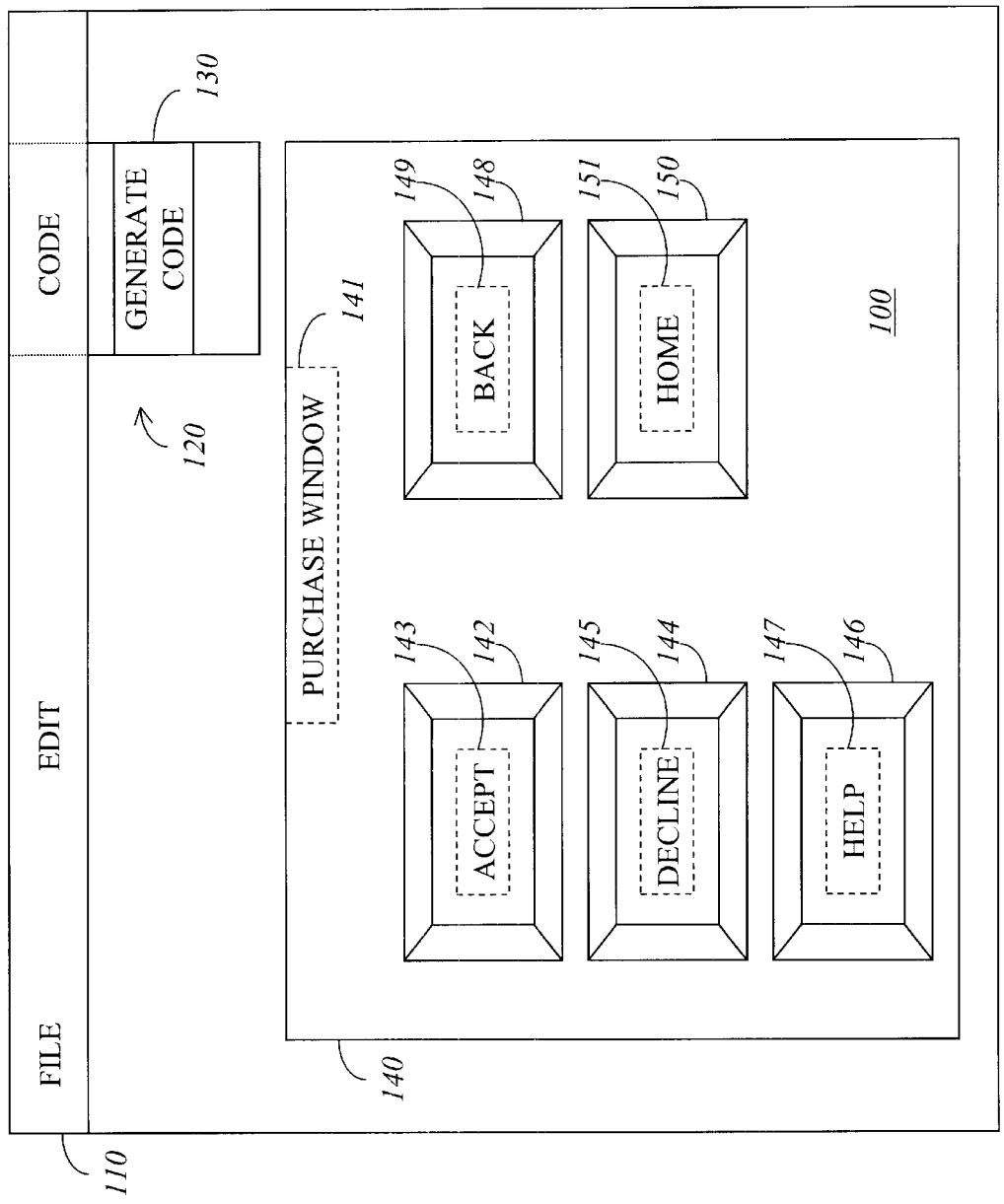
FIG. 1 is an illustrative block diagram of a graphics user interface (GUI) display prior to conversion to a selected software code.

Referring to FIG. 1, an illustrative embodiment of a GUI display 100 during creation is shown. The GUI display 100 is produced in accordance with a standard, menu-driven Windows™ having a menu bar 110 featuring various menu categories. Some of these menu categories may include, but are not limited or restricted to the following: (i) FILE—a selectable pull-down menu featuring a "Save" and/or "Save As" menu option(s) to save a current version of GUI display 100, a "Print" menu option to print a copy of GUI display 100, and a "Quit" menu option to exit the current version of GUI display development software; and (ii) EDIT—a selectable pull-down menu including menu options to produce new or modify current displayable objects on GUI display 100 as described below.

One embodiment of the present invention includes an additional menu category referenced as "CODE", which is a pull-down menu 120 features one or more menu options such as "Generate Code" menu option 130 for example. Upon selecting Generate Code menu option 130, code in accordance with a selected programming language (e.g., C programming) is generated for each displayable object of GUI display 100 such as objects 140–151. These objects 140–151 are created by the user through selection of the type of object, such as a button, text fields and the like, followed by manipulated placement of the object(s) within GUI display 100 as described in FIGS. 2–9 below. The collective grouping of these objects can be used to create complex displayable objects such as a simulated remote control or a simulated front panel for an IRD.

Figure 2:
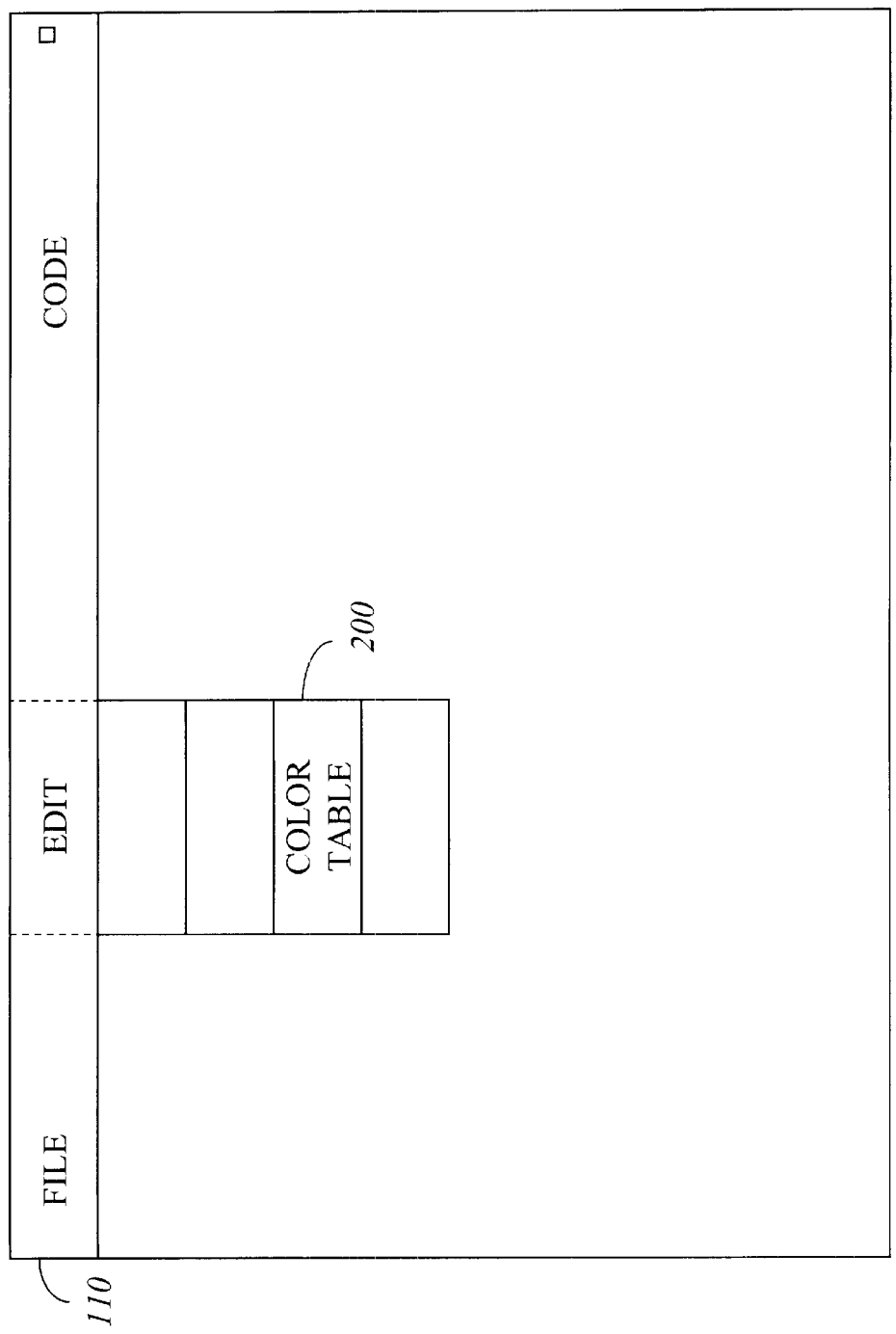
FIGS. 2–4 are illustrative block diagrams of the creation or alteration of colors associated with a color table used by the GUI display of FIG. 1.
Figure 4:
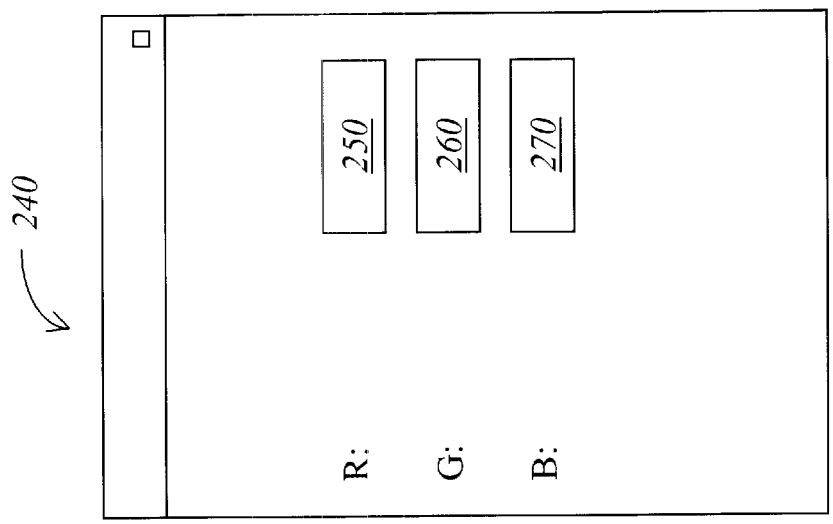
Figure 3:
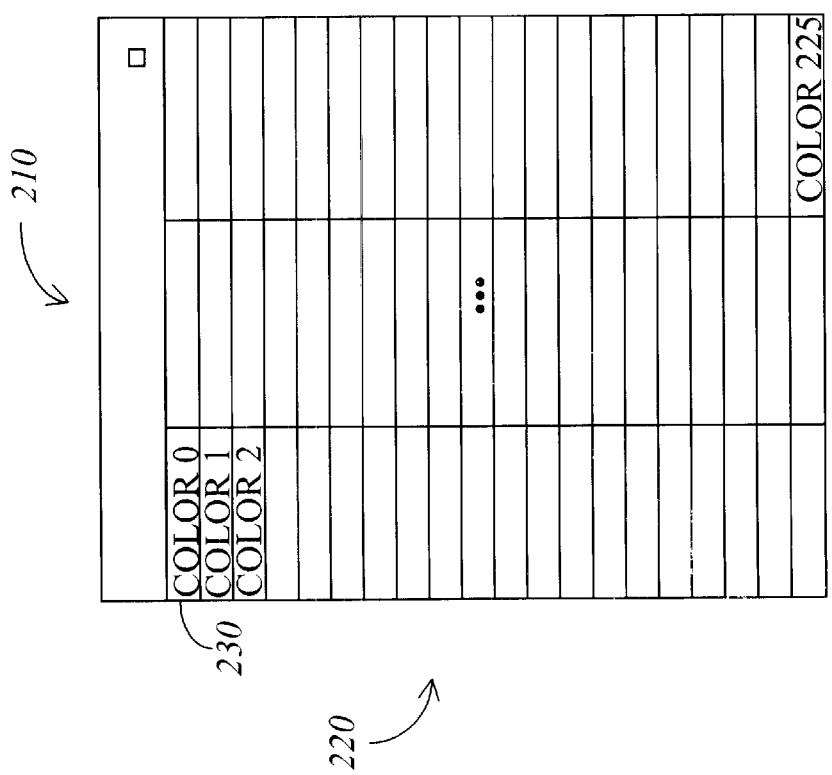

Prior to selection and placement of the objects, as shown in FIGS. 2–4, a color table for the GUI display may be altered by accessing a menu option (e.g., color table) 200 under the EDIT menu category of the GUI display development software. In response to selection of the color table menu option 200, a window 210 is displayed which features a color table 220. In this embodiment, color table 220 displays up to 256 different colors in a tile pattern, where each color is represented by a tile (e.g., tile 230). Modification of the color of tile 230 is permissible by selecting tile 230 to produce a window 240. The window 240 allows Red, Green and Blue (RGB) values 250, 260 and 270 to be entered which, when applied, alter the color of tile 230. Upon completion, all altered colors are saved in color table 220 and applied to objects of GUI display 100 as necessary.

Referring now to FIGS. 5–11, after optional adjustment of the color table, GUI display 100 is designed through successive selection and placement of objects 140–151 (see FIG. 1). This may be accomplished by choosing one or more menu option(s) under the EDIT menu category to produce each object 140–151 in succession. Each displayable object may be repositioned through either selection of certain menu options or through the use of a cursor control device (e.g., a mouse, track ball, touchpad™, stylus, keyboard, or even an appendage of the user in combination with a touch screen).

Figure 5:
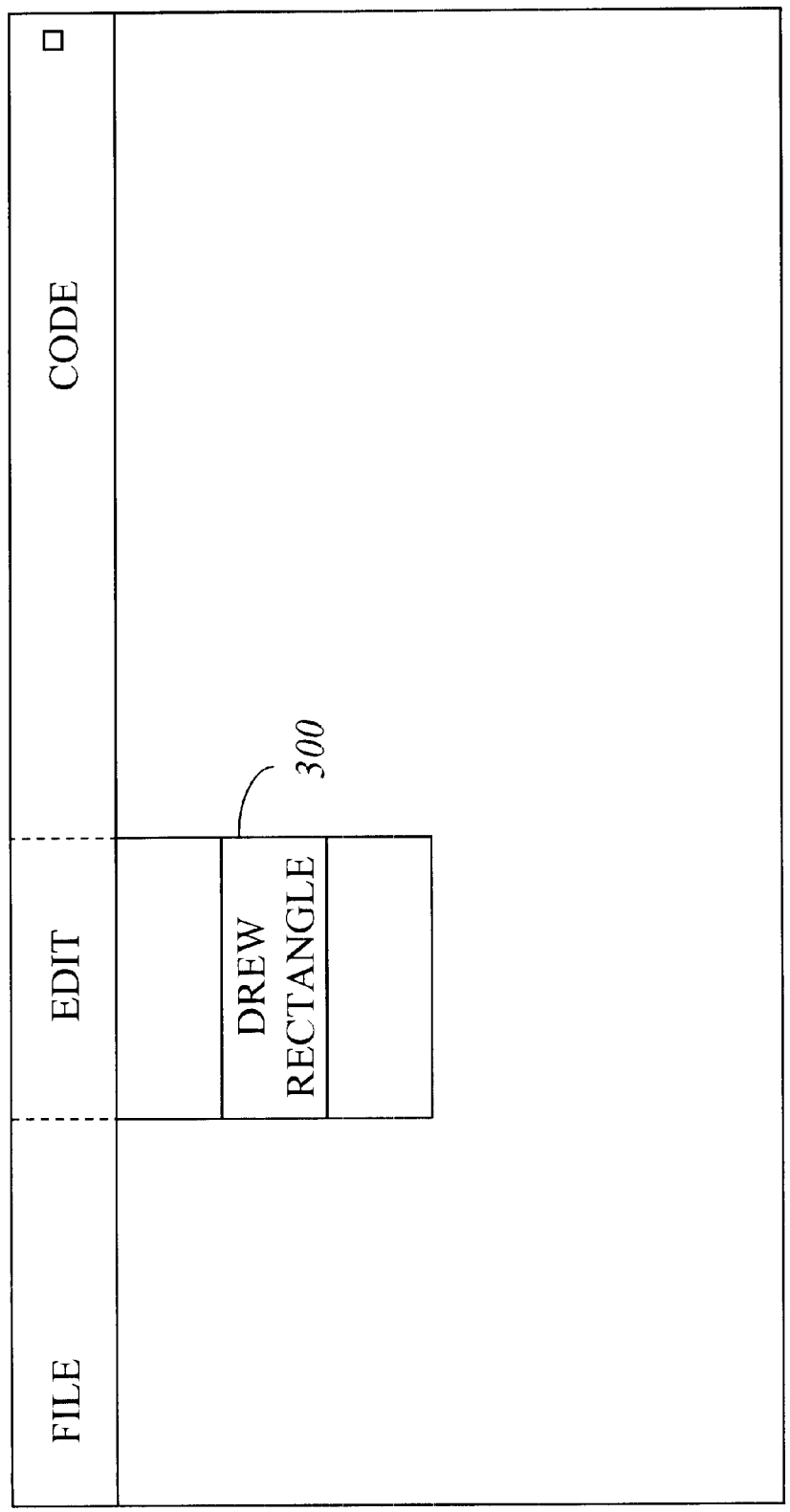
FIGS. 5–6 are illustrative block diagrams of the creation of a rectangular object of the GUI display of FIG. 1.
Figure 6:
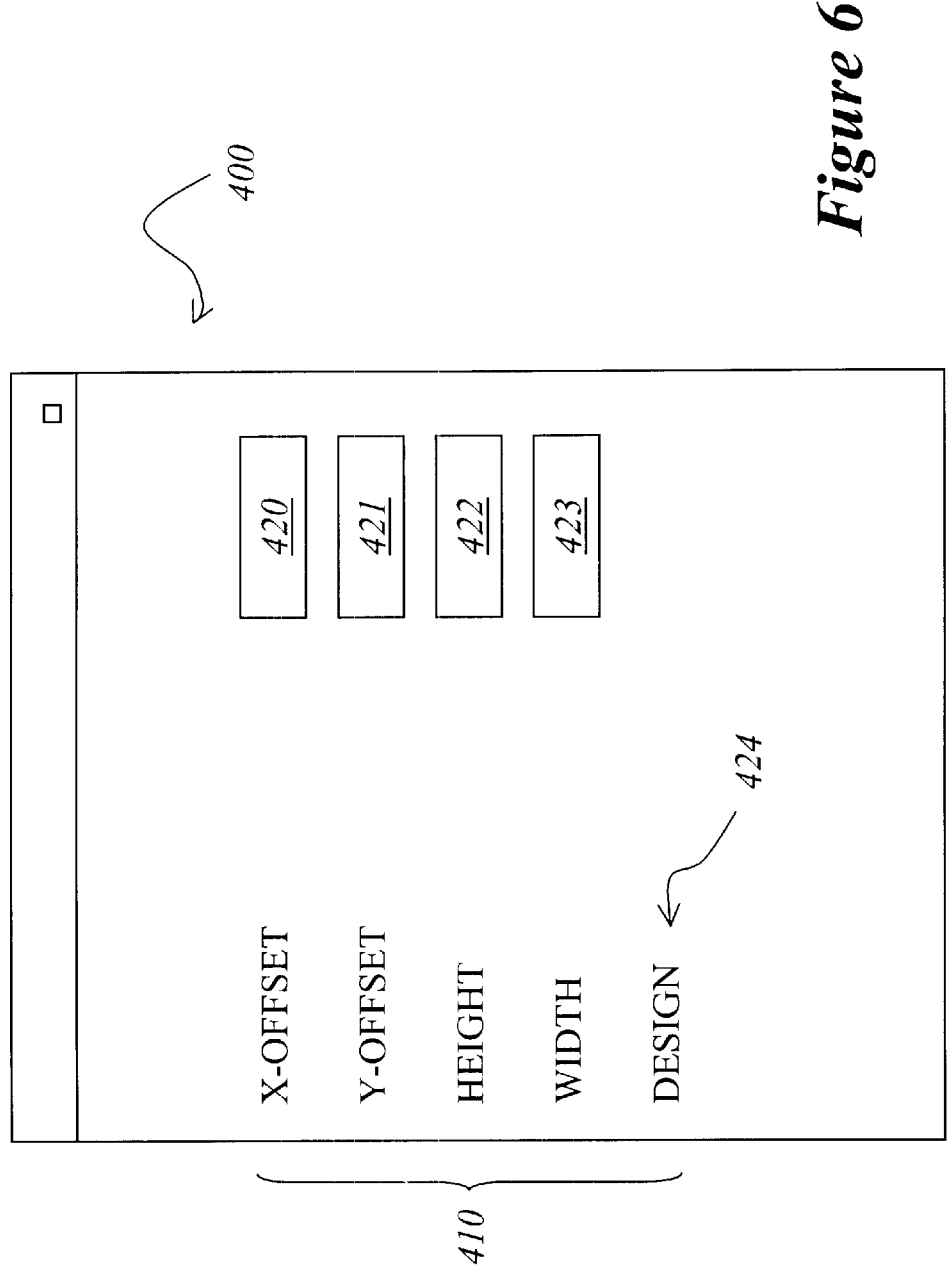
Figure 7:
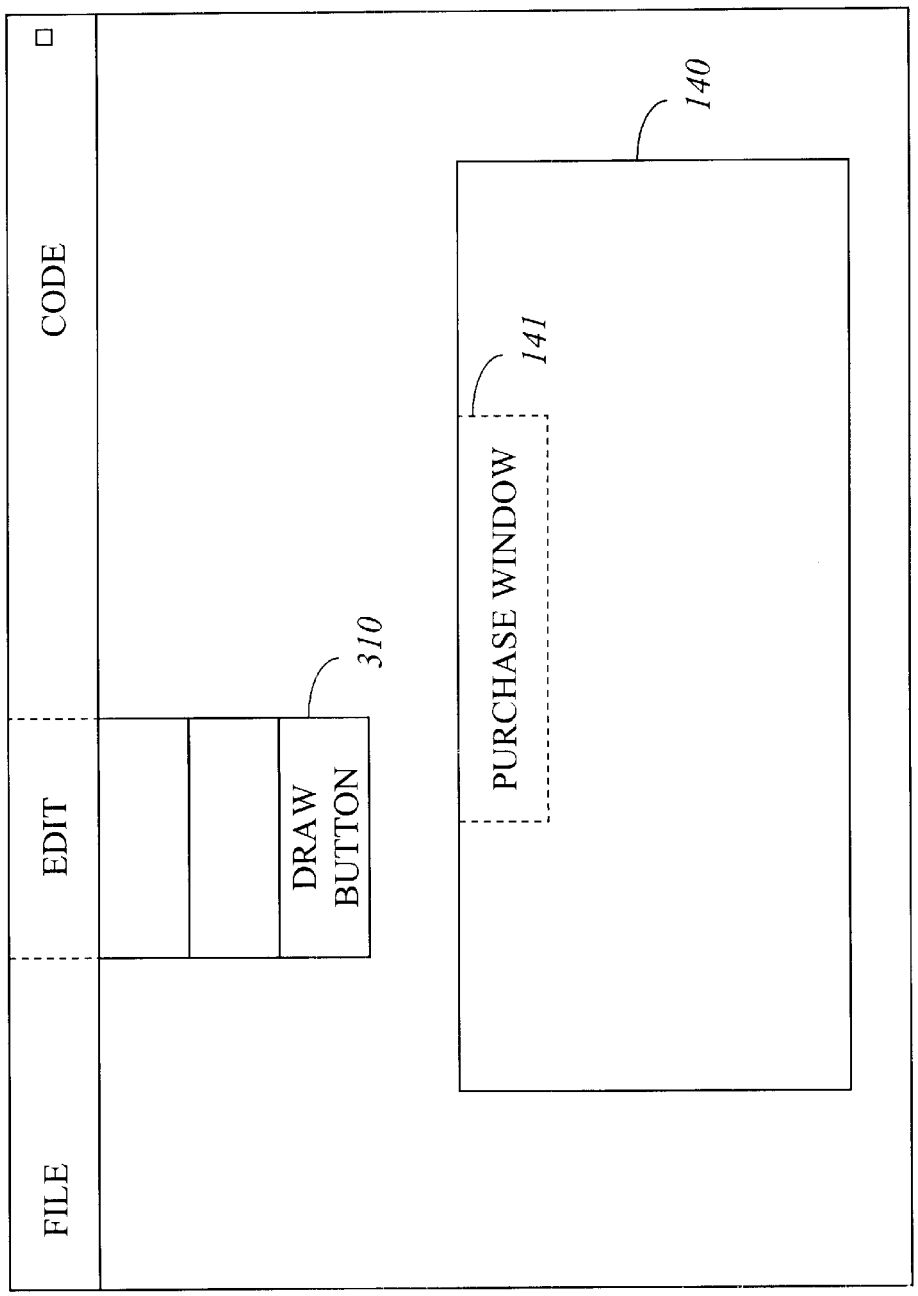
FIGS. 7–9 are illustrative block diagrams of the creation of a button object of the GUI display of FIG. 1.

As shown in FIG. 5, for illustration sake, a first menu option 300 under the EDIT menu category is selected to draw a rectangular object 140 for display. Upon selecting the "Draw Rectangle" option 300, a window 400 (see FIG. 6) is generated featuring entries for a number of parameters 410 to graphically represent object 140. These parameters 410 include, but are not limited or restricted to an X-offset 420, a Y-offset 421, height 422, width 423 and design parameters 424. The X-offset and Y-offset parameters 420 and 421 represent Cartesian coordinates (in pixel elements) with an origin at the bottom leftmost corner of GUI display 100. To set the size of object 140, the height and width parameters 422 and 423 are assigned values (in pixel elements) by the user. Upon selection of design parameter 424, the user may alter particular characteristics of the object such as color or gradation as described below.

Figure 8:
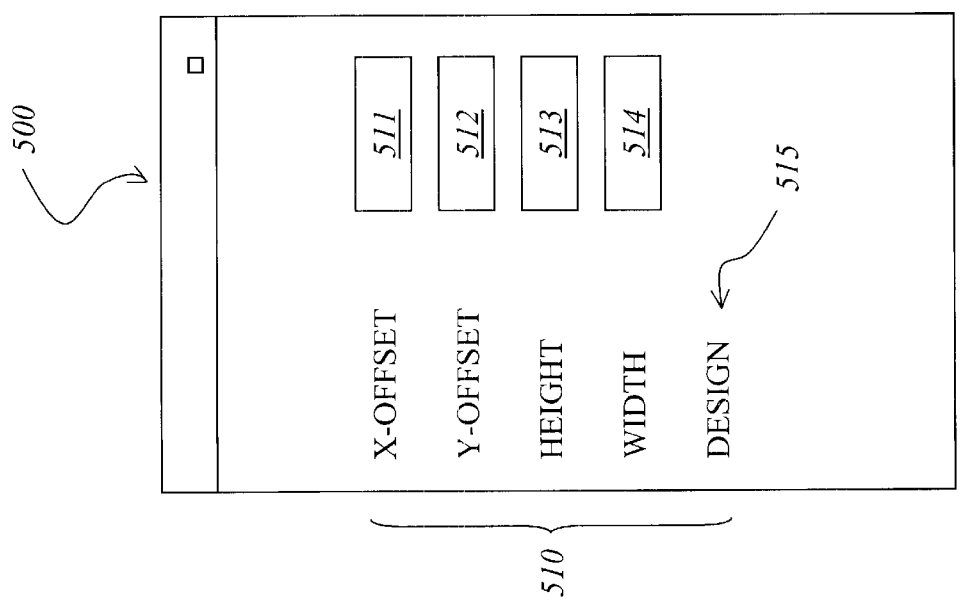

The selection of menu options under the EDIT menu category is performed in succession to produce the GUI display. For example, after objects 140 and 141 are selected, the next object that may be placed in the GUI display is a first button 142 as shown in FIGS. 7–11. This is achieved by selecting a "Draw Button" menu option 310 from the EDIT menu category. Upon selecting the "Draw Button" menu option 310, a window 500 is generated featuring entries for a number of parameters 510 to graphically represent button 142 as shown in FIG. 8. These parameters 510 include, but are not limited or restricted to an X-offset 511, a Y-offset 512, height 513, width 514 and design parameters 515. The X-offset, Y-offset, height and width parameters 511–514 are assigned values as described above. However, upon selection of design parameter 515, various parameters of button 142 may be modified.

Figure 9:
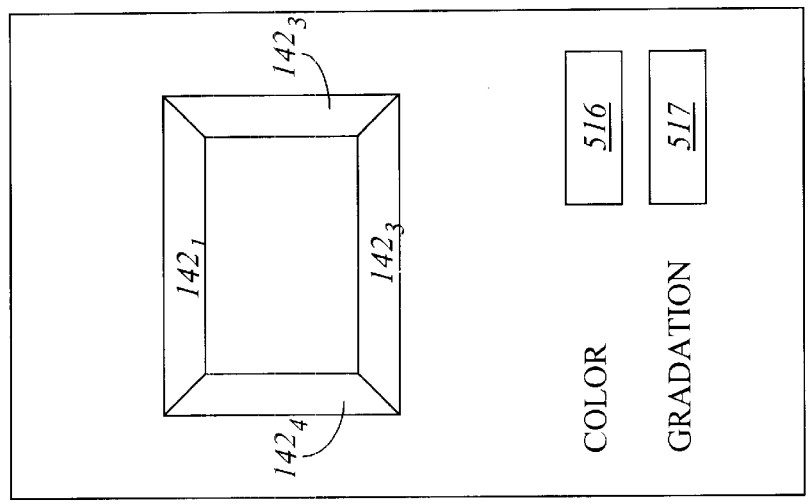

For example, as shown in FIG. 9, various parameters of each line segment $142_1$–$142_4$ of button 142 may be adjusted for customization of button 142. Examples of these parameters include color 516 and gradation 517, namely the degree of shading around the edge of the line segment $142_1$, $142_2$, $142_3$, or $142_4$ to provide depth.

Referring now to FIG. 10, one embodiment of the conversion of a displayable object of the GUI display into source code (e.g., C programming code) is shown. Normally, this conversion is accomplished by a code conversion program 600. In this embodiment, the code conversion program 600 is user-initiated by scrolling down a pull-down menu under a CODE menu category and selecting the "Generate Code" menu option 130 (see FIG. 1). The code conversion program, 600 analyzes the GUI display and creates three resultant files including (i) object data file 610, (ii) color data file 620, and (iii) bitmap data file 630.

The creation of the data files 610, 620 and 630 involves analysis of the graphic nature of each displayable object to discern its general characteristic (e.g., an elliptical or circular button, a rectangle, etc.). This may be accomplished by ascertaining an object identification parameter associated with the object or complex analysis of the values of parameters originally stored the data structure of the displayable object. Thereafter, values are loaded into a predetermined subroutine (e.g., a TYPEDEF structure when converted to C programming language) associated with each object in the object data file 610.

Figure 11:
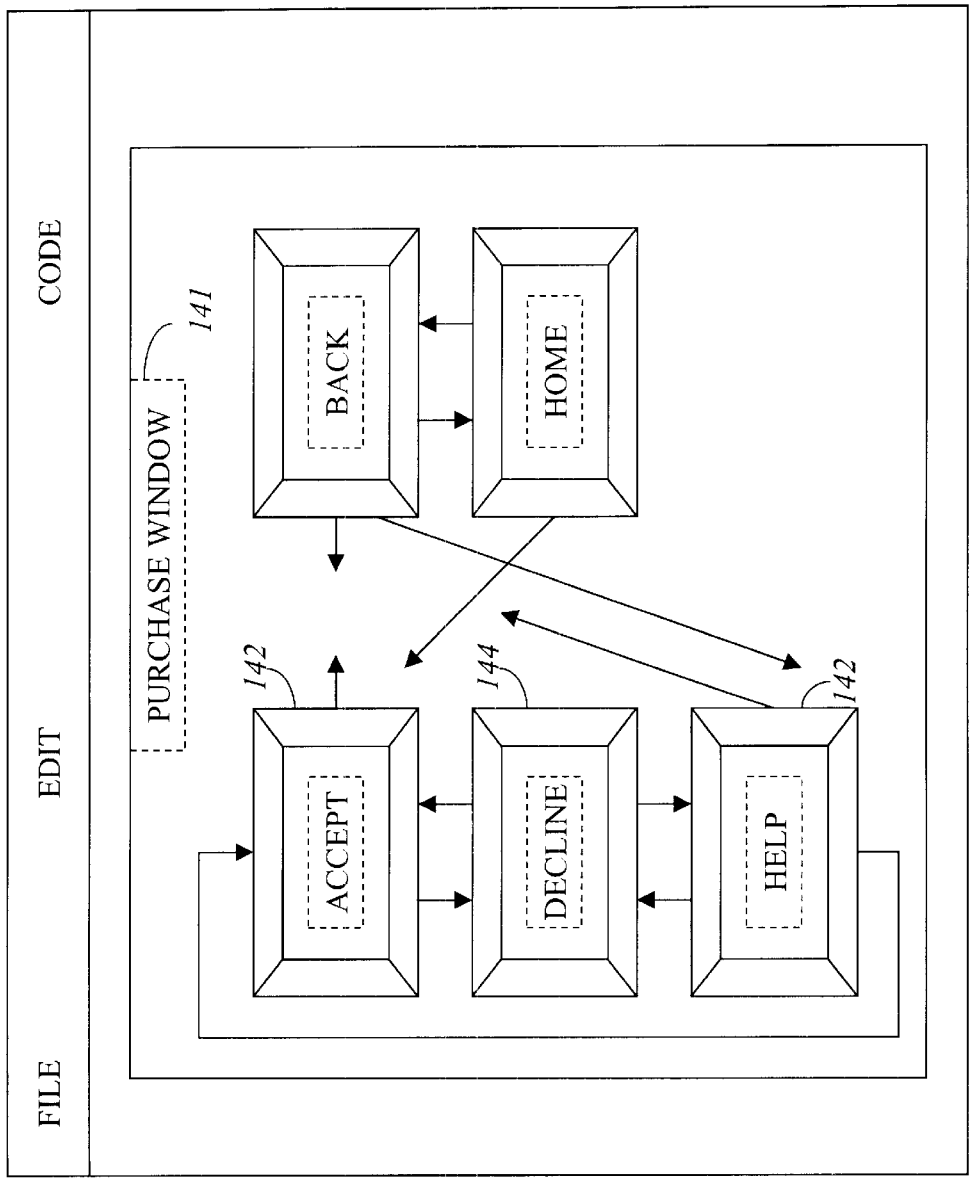

In particular, the object data file 610 includes parameters influencing the location (X-offset, Y-offset) and size (e.g. height, width) associated with each object as well as information concerning its relationship between these objects. For example, as shown in FIGS. 11 and 12, this information may include the object identification to discern one object from another as well as navigation information for each object. The "navigation information" indicates which object that can be highlighted from the current selected object, maintaining a predetermined highlight ordering scheme. In this illustrative example, objects 142 and 144 may be subsequently highlighted in accordance with conventional GUI display operations. However, to handle deviations from the specification (e.g., highlight object 148 or 150) would require a CALLBACK( ) function to be supplied in the software library. The particulars of the CALLBACK( ) function is beyond the scope of the present invention.

In addition, the relationship between objects will be stored in the object data file 610. As shown in FIG. 13, object 140 is considered the parent object including a text object 141 and five (5) button objects 142, 144, 146, 148 and 150. These button objects 142, 144, 146, 148 and 150 include secondary text objects 143, 145, 147, 149 and 151, respectively.

Referring back to FIG. 10, the color data file 620 is loaded with the color table used by the GUI display. The bitmap data file 630 is loaded with bitmaps of any logos or detailed images placed in the GUI display. All of the data files 610, 620 and 630 are compiled with an implementation file 640. In this embodiment, the "implementation file" 640 includes a software library of function calls such as, for example, DRAWRECTANGLE( ) to produce one or more rectangles forming an object, DRAWBUTTON( ) to produce, possibly with the assistance of DRAWRECTANGLE( ), an object on the display having a visual appearance of a selectable button, and the like. Also, implementation file 640 includes the CALLBACK( ) function which is called to alter the highlighting order of objects to differ from standardized for GUI displays as mentioned above.

After compiling the data files 610, 620 and 630 along with implementation file 640, an executable program 650 is produced. The executable program 650 includes data structures (in C programming for example) of images of the GUI display. Thus, an object would be coded to include: (i) name for reference, (ii) its location in pixel elements (X-offset, Y-offset), (iii) its sizing in pixel elements (height, width), (iv) object identification (ID), (v) navigation information of the object, and (vi) any pointer(s) to related objects. For example, the code for object 146 (help button) would be similar to the following:

Button {Helpbutton, 100, 150, 75, 125, 07, straight, opposite, stop, help callback( ), string "HELP"}The executable program 650 is downloaded to the IRD for subsequent usage.

The present invention described herein may be designed in many different embodiments and using many different configurations. While the present invention has been described in terms of various embodiments, other embodiments may come to mind to those skilled in the art without departing from the spirit and scope of the present invention. The invention should, therefore, be measured in terms of the claims that follow.

What is claimed is:

1. A system comprising:

a monitor; and a computer coupled to the monitor, the computer executing software to automatically convert an object appearing on the monitor into a code representation of the object, the converted code being generated from a plurality of parameters including navigation information to maintain a predetermined highlight ordering scheme.

2. The system of claim 1, wherein the object includes a button.

3. The system of claim 1, wherein the object includes a rectangle.

4. The system of claim 1, wherein the object includes a text field.

5. The system of claim 1, wherein a plurality of parameters of the object includes an X-offset value, a Y-offset value, a height value, a width value, a color type and a gradation value.

6. The system of claim 1, wherein the object along with other objects are used to produce a complex display object being one of a simulated remote control and a simulated front-panel.

7. The system of claim 1, wherein the plurality of parameters of the object further includes an object identification.

8. The system of claim 1, wherein the object includes a text string.

9. The system of claim 8, wherein a data structure of the object includes one of an X-offset, a Y-offset, a height, a width and a font type.

10. The system of claim 1, wherein the code representation is a data structure in C programming code.

11. A method comprising:

creating an object characterized by a plurality of parameters including navigation information to maintain a predetermined highlight ordering;

producing a data file from the plurality of parameters associated with the object; and compiling the data file to produce an executable program that, when executed, generates a graphics user interface (GUI) display including the object.

12. The method of claim 11, wherein the producing of the data file includes loading the plurality of parameters into C programming data structures.

13. The method of claim 11, wherein the compiling includes providing an implementation file including a software library of function calls; and compiling together the data file and the implementation file to produce the executable program.

14. The method of claim 11, wherein prior to compiling, the method comprises producing a bitmap file to contain a bitmap of any detailed image in combination with the object.

15. The method of claim 11, wherein the compiling includes providing an implementation file including a software library of function calls; and compiling together the data file and the implementation file to produce the executable program.

16. A machine readable medium having embodied thereon a computer program for processing by a computer, the computer program comprising:

a first program to obtain parameter values associated with an object, the parameter values including navigation information to maintain a predetermined highlight ordering scheme;

a second program to convert the object into a code representation of the object; and a third program to prompt the compilation of the code representation, a software library and the parameter values of the object to produce an executable program that, when executed by the computer, produces signals for displaying the object.

17. A system comprising:

a monitor; and a computer coupled to the monitor, the computer executing software to automatically convert an object appearing on the monitor into a code representation of the object, the converted code being generated by analyzing graphic nature of the object appearing on the monitor.

18. The system of claim 17, wherein the computer is to create at least an object data file, a color data file and a bitmap data file to analyze the graphic nature of the object appearing on the monitor.

19. The system of claim 17, wherein the computer is to execute the software upon a user-initiated selection to convert the object appearing on the monitor into a code representation of the object.

20. The system of claim 19, wherein the user-initiated selection is a selection by a user of a menu option appearing on the monitor.

* * * * *